United States Patent [19]
Citta et al.

[11] Patent Number: 5,598,220
[45] Date of Patent: Jan. 28, 1997

[54] DIGITAL SIGNAL WITH MULTILEVEL SYMBOLS AND SYNC RECOGNITION

[75] Inventors: Richard W. Citta, Oak Park; Gary J. Sgrignoli, Mt. Prospect; Rudolf Turner, Hawthorn Woods, all of Ill.

[73] Assignee: Zenith Electronics Corporation, Glenview, Ill.

[21] Appl. No.: 204,972

[22] Filed: Mar. 2, 1994

Related U.S. Application Data

[63] Continuation-in-part of Ser. No. 894,406, Jun. 5, 1992, abandoned, which is a continuation-in-part of Ser. No. 732,368, Jul. 18, 1991, abandoned.

[51] Int. Cl.$^6$ .................................................. H04N 7/00
[52] U.S. Cl. ............................................. 348/471; 348/495
[58] Field of Search ........................ 348/500, 495, 348/471, 472, 469; 375/264, 364, 365, 368, 286, 293; H04N 7/00, 7/13, 7/133, 7/137

[56] References Cited

U.S. PATENT DOCUMENTS

| | | | |
|---|---|---|---|
| 3,755,624 | 8/1973 | Sekimoto | 178/69.5 TV |
| 3,971,888 | 7/1976 | Ching et al. | 178/69.5 TV |
| 4,675,722 | 6/1987 | Hackett | 358/13 |

FOREIGN PATENT DOCUMENTS

| | | | |
|---|---|---|---|
| 0015388 | 1/1984 | Japan | 358/86 |

OTHER PUBLICATIONS

Digital Communications Fundamentals & Applications; Bernard Sklar, Prentice Hall, 1988, pp. 460–464.

*Primary Examiner*—David E. Harvey

[57] ABSTRACT

A digital video field identification system includes video signals formatted in blocks of video symbols in repetitive data segments with each data segment including a synchronizing signal character. One data segment includes a field timing signal. A reference data segment which includes a reference field timing signal is developed at the receiver. A portion of each data segment is compared with the reference field timing signal and the number of symbol errors is accumulated for each data segment. The data segment exhibiting the least number of symbol errors is identified as the one having the field timing signal. A confidence counter stabilizes the identification of the one data segment. For terrestrial transmission, the video signals are precoded in modulo N form to enable NTSC co-channel interference rejection in the receiver by a linear filter. The linear filter undesirably reduces the S/N ratio by 3 dB and a selection circuit is included for bypassing the linear filter (for the video data) based upon the errors developed in the signal paths with and without the linear filter. For cable transmissions no linear filter is included.

74 Claims, 3 Drawing Sheets

DIGITAL SIGNAL WITH MULTILEVEL SYMBOLS AND SYNC RECOGNITION

CROSS REFERENCE TO RELATED PATENT APPLICATIONS

This invention is a continuation-in-part of Ser. No. 894,406, (now abandoned) filed Jun. 5, 1992, which is a continuation-in-part of Ser. No. 732,368, filed Jul. 18, 1991 (now abandoned), and is related to the inventions described and claimed in U.S. Pat. No. 5,086,340; application Ser. No. 894,388, filed Jun. 5, 1992, which is a continuation-in-part of Ser. No. 763,848, filed Sep. 23, 1991, which is a continuation-in-part of Ser. No. 732,369, filed Jul. 18, 1991, and application Ser. No. 893,486, filed Jun. 5, 1992, which is a continuation-in-part of Ser. No. 732,387, filed Jul. 18, 1991 (now abandoned), all of which are assigned to Zenith Electronics Corporation.

BACKGROUND OF THE INVENTION

This invention relates generally to a high definition television (HDTV) system and specifically to a digital spectrum compatible (DSC) HDTV system.

Zenith Electronics Corporation, which previously announced its spectrum compatible high definition television system, recently announced its digital implementation thereof, which is called DSC-HDTV. In this system, encoded video data is formatted in a transmission frame having a plurality of successive data segments, each comprising a series of multi-level data symbols, including a predetermined data segment sync character. The data segment sync character, which establishes the timing of the data segments, is selected such that it produces a zero or reference level between higher and lower levels at three successive sampling points in the received television signal. The repetitive nature of the data segments and their timing enables ready detection of the data segment sync characters without requiring an excessive amount of data space in each data segment. That invention is described and claimed in copending application Ser. No. 894,388 above.

As fully described in U.S. Pat. No. 5,086,340, referred to above, HDTV receivers preferably employ special linear filters for minimizing the effects of NTSC co-channel signals. The linear filter has null points or notches that correspond to the NTSC signal frequencies that have the greatest interference-causing potential and a notch at DC, which has a benefit in that any direct current components acquired by the signal are precluded from the receiver. Thus, the benefits of the linear filter in the receiver are the rejection of NTSC signal interference and DC rejection. The disadvantages are a 3 dB signal-to-noise (S/N) loss and some corruption of the data. To preserve the data, it is modulo N precoded in the transmitter. The receiver must therefore incorporate suitable postcoding circuitry to reconvert the data. Modulo N precoding may be accomplished by a modulo N adder and a delay circuit in a feedback arrangement and/or by other suitable circuitry. An N level input signal thus yields an N level output signal.

The N level input to a linear filter, consisting of an algebraic adder and a delay circuit in a feed forward configuration, results in a greater than N level output signal. The number of levels is dependent upon the number of feed forward taps on the delay unit. For a single tap delay, the output is given by the formula $2N-1$. The linear filter must be followed by an appropriate "slicer" to yield the correct N level data signals.

Where there is no significant NTSC co-channel interference, the linear filter 3 dB S/N loss may be avoided by processing the precoded modulo N signal through a suitable modulo N postcoder in the receiver to again produce the original N level data signal. It should be apparent that in a benign environment, or one that is devoid of NTSC co-channel interference, such as a cable system, the linear filter is not used.

The transmission system is useful for both terrestrial broadcasting (as described above) and for cable systems. As mentioned, the relatively benign environment of a cable system obviates the need for the linear filter since no NTSC co-channel is experienced and the transmission medium is generally much less noisy. Therefore a data constellation having a greater number of levels (i.e. larger N) may be used for a greater data rate. The principles however are the same.

The transmission frame preferably also includes selected field sync signals. In one embodiment, the field sync or timing signals are 2 level symbols and the data is, for example, in multilevel symbol form, e.g. either 2, 4, 8 or 16 level VSB (vestigial sideband) symbols. The levels of the 2 level symbols may comprise a subset of the multilevel symbols. Thus, if four levels (a), (b), (c) and (d) are used, levels (a) and (c) may be used for 2 level data, all four levels (a), (b), (c), (d) may be used for 4 level data and the two outermost levels (a) and (d) used for the 2 levels of the sync information or timing signals. Such an arrangement yields a robust sync signal, which is highly desirable. As will be seen, the S/N loss introduced by the linear filter in the receiver is acceptable with the more robust 2 outer level sync signal. The interference rejection of the linear filter enables the receiver to stay locked even under very weak and noisy signal conditions.

In another embodiment, the levels of the 2 level data and the synchronizing information may be between or intermediate the two upper and two lower levels of the 4 level data, i.e. between levels (a) and (b) and between levels (c) and (d). In the copending application 894,388 the level intermediate levels (a) and (b) is referred to as level (e) and the level intermediate levels (c) and (d) is referred to as level (f). Thus there are in reality six distinct levels. While the sync in this embodiment is not as robust as sync symbols having the 2 outer levels (a) and (d), the arrangement provides an average pilot which is equal for both 2 level and 4 level data and causes less interference into an NTSC co-channel.

The presently preferred embodiment for terrestrial broadcasting is an 8 level VSB transmission system, whereas for cable systems, the data may be transmitted as 16, 8, 4 or 2 level symbols, depending upon the noise characterizing the system. In a proper environment, 24 level data symbols are quite feasible for an even higher data rate. In the terrestrial transmission embodiment, the 2 level sync symbols preferably comprise levels L2 and L7 (FIG. 3) of the 8 level data symbols, and in the cable transmission systems, the 2 level sync symbols preferably comprise levels P4 and P13 (FIG. 4) of the 16 level data symbols. It will be appreciated that other levels for the sync may be selected within the teachings of the invention.

The invention in copending application Ser. No. 893,486 provides for the selection of alternate signal processing paths in the receiver, for minimizing the S/N loss due to the linear filter, in environments that have no significant NTSC co-channel interfering signals. The selection circuit of that invention bypasses the linear filter in the receiver in situations where NTSC co-channel interference is not determined to be a problem and instead processes the received signal using a complementary postcoding filter.

The present invention is concerned with recovery of a field or frame timing signal from the transmitted data segments. The data segments are the same length, each comprising 684 symbols, with 525 data segments corresponding to a transmitted video frame. Each frame further comprises alternating fields of 262 and 263 data segments. Although the data segments and data fields may be transmitted at the NTSC horizontal and vertical rates, respectively, it will be understood that the data segments do not directly correspond to horizontal scanning lines in a television display system. It will also be understood that this frame structure may be modified to incorporate different numbers of symbols per data segment and data segments per frame or field (such as 313 segments per field and 836 symbols per data segment) as disclosed in copending application Ser. No. 175,061, filed Dec. 29, 1993.

One of the data segments in each video field defines a field timing signal that identifies the beginning of the field. The field timing signal, which may occupy only a portion of the data segment, is thus similar in function to the vertical timing signal in a conventional television system. Means are provided in the receiver for recreating a reference data segment that includes a reference field timing signal. This may be accomplished each data segment with a PROM or other suitable memory device, or preferably may be accomplished by developing the digital field reference timing signal on an as-needed basis using, for example, a pseudorandom sequence generator. Each data segment is detected. The portion (or portions) of each data segment that corresponds to the data segment that contains the field timing signal, is compared with the reference field timing signal in the reference data segment. The errors between corresponding symbols in the compared portions of the data segments are accumulated. The data segment in each field that exhibits the least number of symbol errors is assumed to contain the field timing signal and therefore to identify the start of the field and is used to establish the timing relationship for the receiver. A confidence counter is employed to stabilize the identification process. For enhanced stability, the embodiment includes a different field timing signal in each of the two successive fields of data segments. In this embodiment, a field reference generator may recreate the two different reference field timing signals for comparison with the appropriate portions of the alternating fields of data segments.

OBJECTS OF THE INVENTION

A principal object of the invention is to provide a novel field timing signal for a digital television system.

A further object of the invention is to provide a simple arrangement for identifying a field timing signal in a digital television signal.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
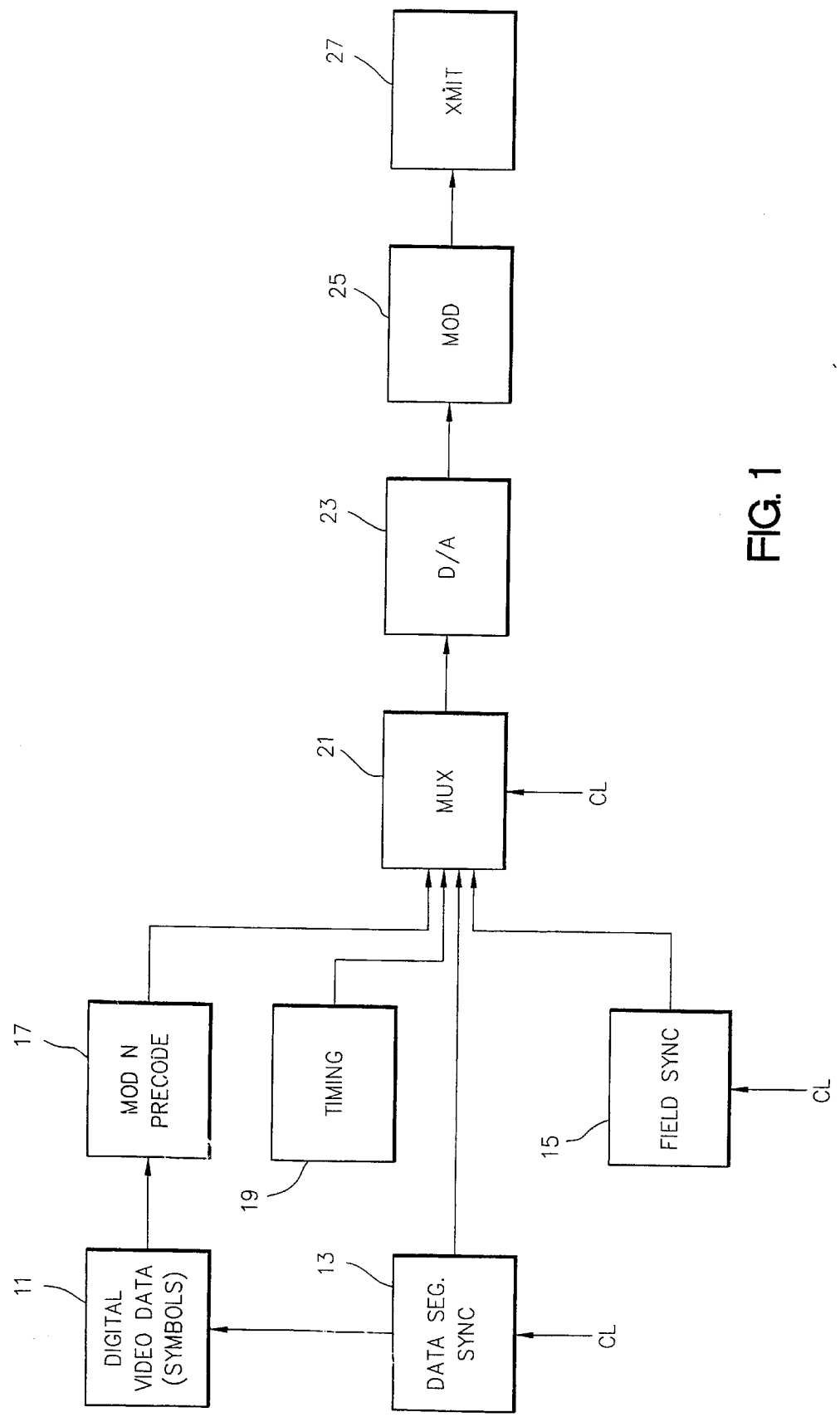
FIG. 1 is a simplified block diagram of a transmitter constructed in accordance with the invention.
Figure 2:
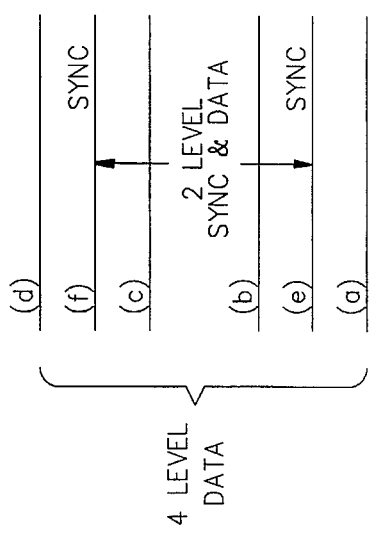
FIG. 2 illustrates the various levels for 2/4 level data symbols and 2 level sync symbols.

In FIG. 1 a transmitter, having a source of digital video data 11 in symbol form, a data segment sync generator 13 and a field sync generator 15, is shown. Data source 11 is coupled to a modulo N precoder 17. It will be understood that precoder 17 may also effect other coding functions. Data segment sync source 13, field sync source 15, precoder 17 and a timing control source 19 are coupled to a multiplexer (MUX) 21. The output of MUX 21 is supplied to a digital-to-analog (D/A) converter 23. D/A 23 feeds a modulator 25 which in turn supplies a signal to a transmission block 27 for transmission. A data clock (not shown) supplies proper timing for the formatting of the data segment sync and the video into groups or fields of successive data segments. The data may be: a) 2 level symbols or 4 level symbols with the data segment sync being 2 level symbols; or b) 2, 4, 8 or 16 level data symbols may be used with the data segment sync being 2 level symbols. The field sync also preferably comprises 2 level symbols although multilevel symbols may also be used. In one embodiment, the four data levels are (a), (b), (c) and (d), with the 2 level data (and data segment sync) comprising levels (a) and (c). In another embodiment, the 2 level symbols for the 2 level data and sync occur at levels intermediate levels (a) and (b) and levels (c) and (d). The field sync uses the same levels as the data segment sync and extends between the outer levels (a) and (d), which makes it robust and therefore easy to detect and noise immune. As shown in FIG. 2, the 2 level sync and 2 level data may also share the same levels (e) and (f) that are intermediate data levels (a) and (b) and data levels (c) and (d), respectively, for the 4 level data.

Figure 4:
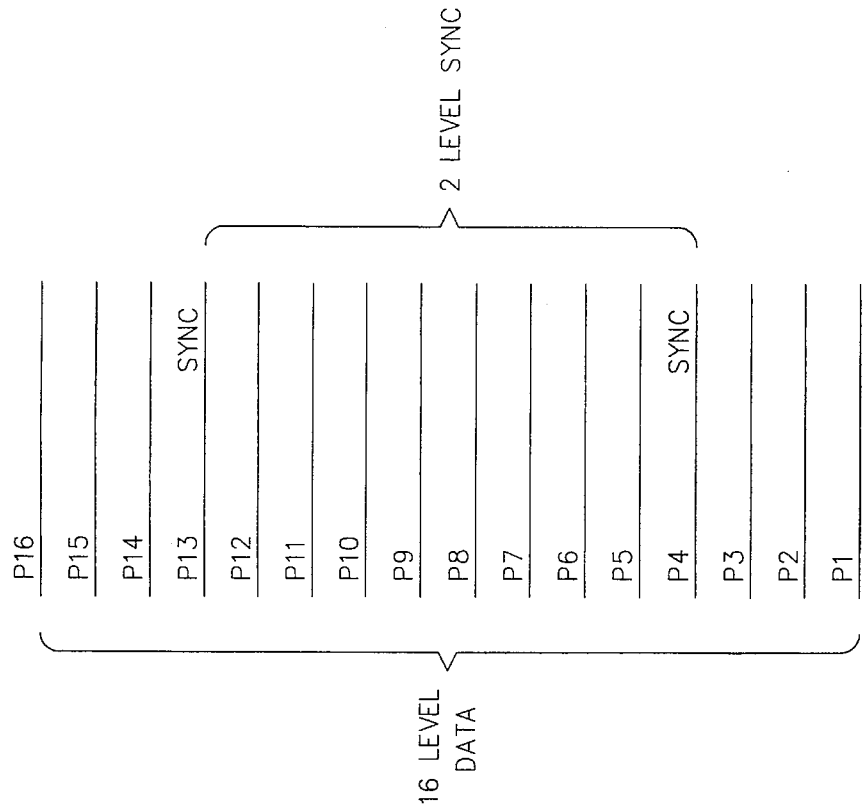
FIG. 4 illustrates the various levels for 16 level data symbols and 2 level sync symbols.
Figure 3:
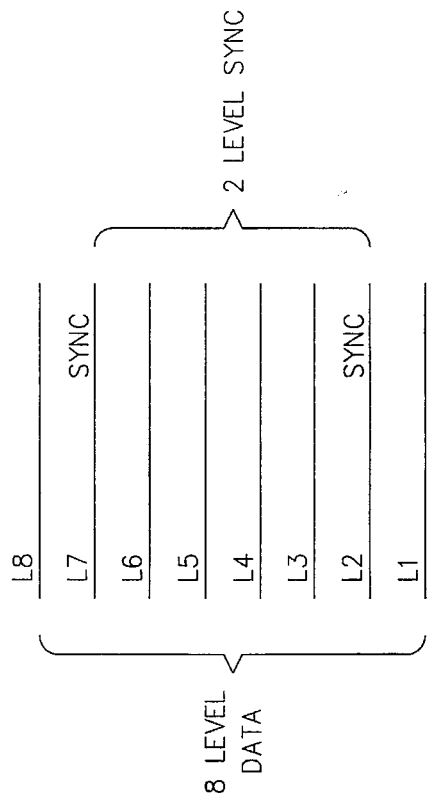
FIG. 3 illustrates the various levels for 8 level data symbols and 2 level sync symbols.

The preferred system comprises a VSB system having 8 level data symbols for terrestrial broadcasts and 16, 8, 4 or 2 level data symbols for a cable environment. These level arrangements are illustrated in FIGS. 3 and 4, respectively. In both cases the sync symbols (data segment and field) are 2 level and coincide with respective levels of the 8 and 16 level data symbols and are intermediate the outer levels of the data. As illustrated in FIG. 3, the data symbols comprise 8 levels L1–L8 with the sync (both data segment and field timing) corresponding to levels L2 and L7. Similarly in FIG. 4 where the 16 levels are P1–P16, the sync levels (both data segment and field timing) correspond to levels P4 and P13. It will, of course, be appreciated that while these specific levels are preferred, the invention is not to be so limited.

The arrangements have proven satisfactory for good sync recovery and have the benefit of reducing sync power and consequent potential for interference into co-channels for the terrestrial case (VSB=8) and for maximizing the data rate (VSB=16) for the more benign cable environment.

Figure 5:
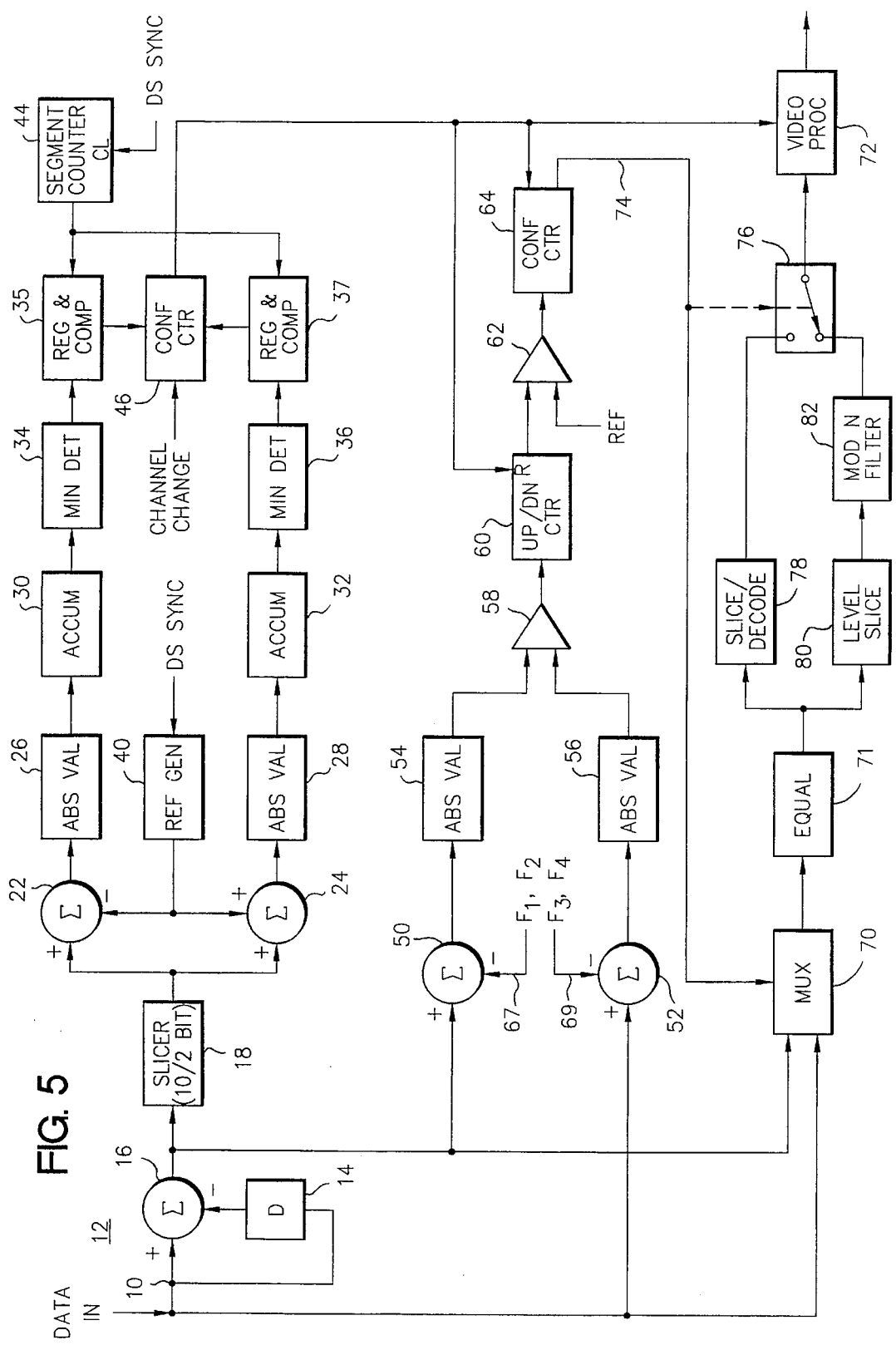
FIG. 5 is a simplified block diagram of a field timing signal determination circuit and a receiver post coder selection circuit.

Referring to FIG. 5, a received digital video data signal is supplied to an input terminal 10. It will be appreciated that different multilevel symbols, may be used and identified (as to type) by suitable header information in the data transmission. In the terrestrial system shown, 8 level data symbols corresponding (FIG. 3) are assumed. It will be appreciated that, while not shown, all of the relevant receiver circuits are supplied with clock timing signals. Consequently, the data segments are locked and the task is to determine which of the data segments is the field timing data segment which includes the field timing signal for denoting the beginning of the associated field. Two field timing data segments, each comprising 668 pseudo random 2 level symbols, as previously described, are used and the "No. 1" data segment differs from the "No. 263" data segment. For example, the No. 263 data segment may have a polarity that is the reverse of that of the No. 1 data segment. As discussed above, the field timing signal may occupy only a portion of the entire data segment. Those skilled in the art will readily recognize that it is not necessary to identify a field timing data segment in each field, one data segment for each frame being sufficient. However, the redundancy of a field timing data segment in each field enables better, more reliable performance and faster acquisition.

The video data is in the form of precoded modulo N video symbols as specified in U.S. Pat. No. 5,086,340. (The synchronizing signals are seen not to be precoded in the transmitter of FIG. 1.) The input signal includes successive fields of video data, each field containing repetitive data segments of 684 symbols each. Two successive data fields (of 262/263 data segments) are transmitted for each data frame. A data segment sync interval at the beginning of each data segment includes a predetermined data segment sync character preferably comprising four 2 level symbols for establishing data segment timing. As previously mentioned, each of the alternating fields of 262/263 data segments corresponds to one NTSC field although the data segments do not individually correspond to horizontal NTSC lines. A linear post coder circuit 12, configured in a complementary relationship to the transmitter modulo N precoder, comprises a feed forward circuit including a delay 14 and a linear adder 16 with a negative feed forward input. As discussed above, post coder 12 has notches at the NTSC frequencies that have the greatest co-channel interference effects and a notch at DC which precludes any DC that the signal may have acquired from entering the receiver.

It will be noted that linear filter 12 is part of the circuit that determines the field timing signals. This may be preferable for terrestrial broadcasts since the field timing signals must be found, i.e. detected, even in very noisy environments and the presence of NTSC interfering signals can make that task extremely difficult. Obviously, for cable or benign environments, the linear filter is not used. Despite the S/N ratio loss with linear filter 12, its effect in reducing interference makes it highly desirable in the field timing signal recognition circuit. While the use of the two outermost levels of the N level signals would make the field timing signals relatively easy to find, even in noisy environments, the added signal power has more interference causing potential. Preferably, levels intermediate the outermost levels of the multilevel data symbols and coincident with corresponding ones of those levels are used, as shown in FIGS. 3 and 4, for the 2 level data segment and field sync signals.

The output of adder 16 is applied to a slicer 18 where the 10 bit symbols are converted to 2 bit symbols (for terrestrial) and 1 bit symbols (for cable), which simplifies the hardware because the reference field timing signals also need only be 2 bit or 1 bit symbols. The output of slicer 18 is applied to a pair of adders 22 and 24, each of which in turn supplies a respective one of a pair of absolute value circuits 26 and 28. The absolute value circuits 26 and 28 are in turn respectively coupled to error accumulators 30 and 32, each having its output coupled to a respective one of minimum detectors 34 and 36. The outputs of minimum detectors 34 and 36 are respectively coupled to individual register-comparators 35 and 37. The register-comparators 35 and 37 are coupled to a segment counter 44 that is clocked by the data segment sync and determine which of the compared portions of the data segments accumulates the smallest number of symbol errors (when compared with a reference field timing signal) in each respective data field. It will be understood that the entire data segment need not be compared; only the portion that would be occupied by the field timing signal is compared to the reference field timing signal. The outputs of the register-comparators 35 and 37 are applied to a confidence counter 46 that supplies the number of the data segment that exhibits the smallest number of errors from the comparison and which is determined to contain the field timing signal. The other inputs of adders 22 and 24 are supplied with reference field timing signals from a reference generator 40. These reference field timing signals correspond to the 3-level (resultant) field timing signals in the respective No. 1 and No. 263 data segments in each of the data fields as developed by linear filter 12 and slicer 18. It will be appreciated that the field timing data segments are not precoded (see FIG. 1) and are 2 level symbols. These 2 level symbols are however converted into 3 levels when passed through linear filter 12. The reference field timing signals, one for each field of a frame, are created in reference generator 40 and are outputted by the data segment sync which is developed in accordance with the teachings of Ser. No. 894,388 above. It will be observed that the received signal must be locked by the data segment sync in order to identify the field timing signals.

While the errors between the compared portions of each data segment and the reference field timing signal are noted for each data segment, it will be appreciated that "agreements" or "non agreements" between compared symbols may be used with equal facility. The presence of slicer 18 makes this approach preferable from an implementation viewpoint. Suitable changes in circuitry should be obvious to those skilled in the art to test for agreements/non agreements rather than errors and the invention should not be limited to counting errors.

In the preferred embodiment of the invention, the field timing signal in the No. 263 data segment has a polarity opposite to the field timing signal in the No. 1 data segment. Thus a common reference field timing signal may be applied to both adders 22 and 24 with adder 22 detecting the No. 1 data segment (assuming its field timing signal has a positive polarity) since it is configured in a subtractive sense and adder 24 testing the No. 263 data segment since it is configured in an additive sense. While preferred, the use of identical, but opposite polarity reference field timing signals is also not to be considered limiting of the invention The video data at terminal 10 is also applied directly to one input of a MUX 70 and through linear filter 12 to the other input of MUX 70. In accordance with the invention claimed in copending application Ser. No. 893,486, a switching signal selects which of the input data signals (unfiltered or linear filtered) is coupled by MUX 70 to video processor 72 for further processing. The switching signal selection circuitry includes an adder 50, to which is applied the signal from linear filter 12, and an adder 52, to which is applied the signal from input terminal 10, both adders being configured in a subtractive sense. Adder 50 is supplied at its negative input with two reference field timing input signals F1, F2 on lead 67 and adder 52 is similarly supplied with reference field timing signals F3, F4 on lead 69. The reference signals F1 and F2 represent the alternate field timing signals (as received from linear filter 12) whereas the reference signals F3 and F4 similarly correspond to the field timing signals received directly from input terminal 10. The outputs of adders 50 and 52 represent the difference or error between corresponding symbols in the input field timing signals and the reference field timing signals, and are supplied to absolute value circuits 54 and 56, respectively. The absolute value of the errors are coupled to a comparator 58 whose output goes high when the error produced by circuit 56 exceeds the error produced by circuit 54 and goes low when the error produced by circuit 56 is less than the error produced by circuit 54. The output of comparator 58 supplies an UP/DN counter 60, which counts up in response to one output from comparator 58 and counts down in response to the opposite output.

The field sync from confidence counter 46 is supplied to the reset terminal of UP/DN counter 60 and to an enable input of a confidence counter 64. The UP/DN counter 60 output is compared with a fixed reference number in a comparator 62. The output of comparator 62, which is high or low based upon the relationship between the count of counter 60 and the fixed reference number, is supplied to confidence counter 64 which develops a switching signal on a lead 74 for switching MUX 70 and operating another switch 76. Confidence counter 64, by having its enable input supplied with field sync, is enabled at the end of the appropriate data segments to respond to the output of comparator 58. If the count in counter 60 is above the reference number at the end of the field timing signal data segment, confidence counter 64 counts in one direction. If it is not, confidence counter 64 counts in the other direction. The "bias" is toward selection of the non post coder path and the reference number establishes the number of errors that are tolerated before switching to the post coder path (through filter 12).

The output of MUX 70 supplies an equalizer 71 that is incorporated prior to decoding of the signal to help correct for various distortions, such as ghosts and channel tilt. Equalizer 71 supplies a slicer/decoder 78 and a level slicer 80. Slicer/decoder 78 is coupled to one terminal of switch 76 and slicer 80 is coupled to another terminal of switch 76 through a modulo N filter 82 which comprises the complement of the transmitter modulo N precoding filter. The symbol levels required to be processed by slicer/decoder 78 depends upon the levels selected for the data, field sync and data segment sync. In a system using 2 level syncs [levels (e) and (f)] and 2 or 4 level data [any of levels (a)–(f)] of FIG. 2, slicer/decoder 78 would be capable of reconverting the 13 levels of the linear filtered signal to the original 2 and 4 level signals. Similarly slicer 80 would be configured to properly slice the precoded 2 or 4 level data and non precoded 2 level syncs. For the preferred arrangement of FIG. 3, slicer/decoder 78 would be configured to reconvert the levels of the linear filtered data and slicer 80 to slice the non linear filtered precoded 8 level data symbols and 2 level syncs. Thus, the video data is applied through slicer 80 and filter 82 when NTSC co-channel interference is not a significant problem and otherwise it is applied through slicer/decoder 78.

To recapitulate, the switching circuit selects either the input signal at data input terminal 10 or the input signal as processed by linear post coder filter 12, for processing in the receiver. The determination is made by comparing the field timing signals (which are not precoded) with suitable reference field timing signals and selecting the path that displays the least number of errors. The reference field timing signals F1 and F2 are the same as those generated by reference generator 40 and are switched in accordance with the field that is being received. The reference field timing signals F3 and F4 differ because the effect of linear filter 12 is not present at input terminal 10. The circuit is locked to the output of the field timing signal recognition circuit described above and compares each symbol in the stored reference field timing signal with the corresponding symbols in the field timing signal data segments, as passed directly and as processed by the linear filter (post coder) 12. The absolute values of the errors are compared since the sign or polarity of an error is immaterial. The determination as to whether the signal in the direct path exhibits a sufficiently lesser or greater number of errors than the signal as processed by the linear filter 12 is established by the reference number applied to the comparator 62. The field timing signal (sync) at the reset terminal of counter 60 enables counter 60 to respond to the output of comparator 58 when the reference field timing signals are being compared with the field timing signals. The confidence counter 64 stabilizes the determination of the error detection circuitry and develops the switching signal for MUX 70 and switch 76 for selecting the signal processing path that produces the "least" number of errors. It should be apparent from the above discussion that the term "least" used herein is relative and really denotes the number of errors to be tolerated before a switchover to the post coder path is made. Thus if the incoming video data is subjected to NTSC co-channel interference, the processing path that includes linear filter 12 (which removes the majority of the NTSC co-channel interference) will produce significantly fewer errors than the direct signal processing path and, depending upon the reference number selected, MUX 70 and switch 76 will be switched to select the path through linear filter 12 and slicer/decoder 78 for supplying the signal to video processor 72. On the other hand, if the incoming video data is not subjected to significant NTSC co-channel interference, MUX 70 and switch 76 select the path from input terminal 10 through level slicer 80 and modulo 4 filter 82 for supplying the signal to video processor 72.

Referring back to the identification circuit of the invention, confidence counter 46 develops a field sync signal that indicates occurrence of the No. 1 and No. 263 data segments which mark the beginning of the associated fields. This output is used to synchronize the video processing circuit 72. The confidence counter counts up from zero to a maximum when the data segment with the smallest number of field timing signal symbol errors matches the previous data segment having the smallest number of field timing signal symbol errors and counts down when a different data segment exhibits the smaller number of symbol errors.

The rate of counting up may advantageously be made different from the rate of counting down to favor the locked condition. These design considerations are determined by signal conditions and empirical data to avoid abrupt changes in synchronization. A channel change input is provided for resetting confidence counter 16 to zero immediately after a change in channel occurs.

Thus, it will be seen that the invention provides for ready recognition of the field/frame timing signals based upon comparison with reference field timing signals recreated in the receiver.

It will be appreciated that the particular techniques disclosed for identifying the field timing signal and selecting the alternate paths are interchangeable. Thus, the technique for comparing symbol errors may readily be substituted for the technique for accumulating errors in a data segment. Additionally, other error determination schemes may be employed with equal facility.

What is claimed is:

1. A digital television signal receiver comprising:
   means for receiving a digital signal formatted in blocks of video information in the form of multilevel data symbols and having repetitive data segments, each data segment including a plurality of said data symbols and each data segment including synchronizing signals for establishing a fixed timing relationship between successive ones of said data segments, with one of said data segments including a field timing signal;

means for developing a reference field timing signal, at the repetition rate of said repetitive data segments;

means for comparing at least a portion of each of said received data segments with said reference field time signal; and detection means responsive to the comparison for determining said one data segment in said video block.

2. The receiver of claim 1 wherein each of said video blocks comprises a field with successive pairs of said fields forming a frame and wherein each of said successive pairs of fields includes a field timing signal for identifying its corresponding field.

3. The receiver of claim 1 wherein said comparing means includes accumulating means for counting the number of symbol errors between each of said portions of said data segments and said reference field timing signal and wherein said detection means selects, as said one data segment, the data segment in said video block that exhibits the least number of symbol errors.

4. The receiver of claim 1, further including confidence counter means coupled to the output of said detection means for stabilizing the selection of said one data segment.

5. The receiver of claim 4 wherein each of said video blocks comprises a field with successive pairs of said fields forming a frame and wherein each of said successive pairs of fields includes a field timing signal for identifying its corresponding field.

6. A digital television signal receiver comprising:

means for receiving a digital signal formatted in blocks of video information having repetitive data segments with one of said data segments including a field timing signal;

a filter for reducing certain co-channel interference characterizing said received signal;

means for developing a reference field timing signal, at the repetitive rate of said repetitive data segments; and means for comparing at least a portion of each of said filtered data segments with said reference field timing signal to identify said one data segment.

7. The receiver of claim 6 wherein said field timing signal has N levels and wherein said filter produces an output having M levels in response to said N level field timing signal, with M being greater than N.

8. The receiver of claim 7 wherein said developing means generates an M level signal.

9. The receiver of claim 6 wherein said video information comprises P level symbols and wherein said field timing signal comprises 2 level symbols nested within the outermost levels of said E level symbols.

10. The receiver of claim 6 wherein said video information is in the form of data symbols with each of said data segments including a plurality of said data symbols and further including:

error means for identifying errors between each of said portions of said data segments and said reference field timing signal; and detection means responsive to said error means for determining said one data segment in said video block.

11. The receiver of claim 10, further including confidence counter means coupled to the output of said detection means for stabilizing the determination of said one data segment.

12. The receiver of claim 11 wherein each of said video blocks comprises a field with successive pairs of said fields forming a frame and wherein each of said successive pairs of fields includes a field timing signal for identifying its corresponding field.

13. The receiver of claim 6 wherein said video information comprises 4 level data symbols and said field timing signal comprises 2 level symbols that are, respectively, intermediate the upper and lower two levels of said 4 level symbols.

14. The receiver of claim 13 wherein said video information also includes 2 level data symbols occurring at the same levels as said field timing signal symbol levels.

15. The receiver of claim 6 further including:

error means for identifying errors between each of said portions of data segments and said reference field timing signal; and detection means responsive to said error means for determining said one data segment in said video block.

16. The receiver of claim 15, further including confidence counter means coupled to the output of said detection means for stabilizing the determination of said one data segment.

17. The receiver of claim 16 wherein each of said video blocks comprises a field with successive pairs of said fields forming a frame and wherein each of said successive pairs of fields includes a field timing signal for identifying its corresponding field.

18. A digital television signal receiver comprising:

means for receiving a digital signal formatted in blocks of video information having repetitive data segments, each of said data segments including synchronizing signals for establishing a fixed timing relationship between successive ones of said data segments, with one of said data segments including a field timing signal;

a filter for reducing certain co-channel interference characterizing said received signal;

means for developing a reference field timing signal, at the repetition rate of said repetitive data segments; and means for comparing at least a portion of each of said filtered data segments with said reference field timing signal to identify said one data segment.

19. The receiver of claim 18 wherein said video information is in the form of data symbols with each of said filtered data segments including a plurality of filtered data symbols and further including:

error means for identifying errors between each of said portions of said filtered data segments and said reference field timing signal; and detection means responsive to said error means for determining said one data segment in said video block.

20. The receiver of claim 19, further including confidence counter means coupled to the output of said detection means for stabilizing the determination of said one data segment.

21. The receiver of claim 20 wherein each of said video blocks comprises a field with successive pairs of said fields forming a frame and wherein each of said successive pairs of fields includes a field timing signal for identifying its corresponding field.

22. The receiver of claim 18 wherein said received field timing signal has N levels and wherein said filter produces an output having M levels in response to said N level field timing signal, with M being greater than N.

23. The receiver of claim 18 wherein said developing means generates an M level signal.

24. The receiver of claim 18 wherein said video information comprises P level symbols and wherein said field timing signal comprises 2 level symbols nested within the outermost levels of said P level symbols.

25. The receiver of claim 18 wherein said video information comprises 4 level data symbols and wherein said field timing signal consists of 2 level symbols with the levels of said 2 level symbols being, respectively, intermediate the upper and lower two levels of said 4 level symbols.

26. The receiver of claim 25 wherein said video information also includes 2 level data symbols occurring at the same levels as said field timing signal symbol levels.

27. A digital television signal receiver comprising:

means for receiving a digital signal formatted in blocks of video symbols having repetitive data segments with each data segment including a fixed number of symbols including a synchronizing character for establishing a fixed timing relationship, and one of said data segments including a field timing signal;

a filter coupled to said receiving means for reducing certain co-channel interference characterizing said digital signal;

means for developing a reference field timing signal, at the repetition rate of said repetitive data segments;

means for comparing at least a portion of each of said filtered data segments with said reference field timing signal;

error means for identifying errors between each of said portions of said filtered data segments and said reference field timing signal;

detection means responsive to said error means for determining said one data segment in said video block; and confidence counter means coupled to the output of said detection means for stabilizing the determination of said one data segment.

28. The receiver of claim 27 wherein each of said video blocks comprises a field with successive pairs of said fields forming a frame and wherein each of said successive pairs of fields includes a field timing signal for identifying its corresponding field.

29. The receiver of claim 28 wherein said identifying means includes accumulating means for counting the number of symbol errors between each of said portions of said filtered data segments and said reference field timing signal and wherein said detection means selects, as said one data segment, the data segment in said video block that exhibits the least number of symbol errors.

30. In a digital television signal system having multilevel symbols within an amplitude range, a receiver comprising:

means for receiving a digital signal including repetitive data segments comprising N-level data symbols with one of said data segments including a field timing signal, said N level data symbols comprising any of said N levels within said amplitude range and said field timing signal being at two predetermined levels within said amplitude range;

a linear co-channel interference reduction filter for providing an output filtered data segment in response to each received data segment, including an output filtered field timing data segment comprising a plurality of M-level symbols, where M is greater than N;

means for developing an M level reference field timing signal, at the repetition rate of said repetitive data segments; and means for comparing at least a portion of each filtered output data segment with said M level reference field timing signal to identify said one data segment.

31. The receiver of claim 30, further including:

error means for identifying errors between each of said portions of said filtered output data segments and said reference field timing signal; and detection means responsive to said error means for determining said one data segment.

32. The receiver of claim 31, further including confidence counter means coupled to the output of said detection means for stabilizing the determination of said one data segment.

33. The receiver of claim 30 wherein said repetitive segments of N level data symbols are formatted in frames consisting of two successive fields each including a field timing signal, and wherein two reference data segments are developed, each of said reference data segments including an M level reference field timing signal for identifying its corresponding field.

34. The receiver of claim 30 wherein said two predetermined levels comprise respective ones of said N levels which are less than the outermost levels of said amplitude range.

35. The receiver of claim 30 wherein N is equal to four and wherein said two predetermined levels are intermediate the first and second and second and third of said four levels.

36. A method of operating a digital information signal transmission system comprising:

transmitting data as 2 and 4 level symbols with the 2 levels being intermediate respective pairs of the 4 levels; and transmitting sync information at said 2 intermediate levels.

37. A method of operating a digital information transmission system comprising:

transmitting data as two level and four level symbols having one of six different amplitudes within an amplitude range; and transmitting sync information as two level symbols, where said two levels are at the second and fifth of said six different amplitudes.

38. A digital signal receiver comprising:

means for receiving a digital signal comprising repetitive data segments of N and M level symbols, where M is greater than N, with one of said data segments including a field timing signal, the field timing signal being generated using only said N levels;

means for developing a reference field timing signal at the repetition rate of said repetitive data segments; and means for comparing at least a portion of each received data segment with said reference field timing signal to identify said one data segment.

39. The receiver of claim 38 including a co-channel interference reduction filter for providing a P-level output signal in response to said received one data segment and a Q level output signal in response to other received data segments, where Q is equal to 2M−1 and P is equal to 2N−1, said reference field timing signal comprising P levels and said comparing means comprising means for comparing at least a portion of each of said output signals with said P-level reference field timing signal.

40. The receiver of claim 39 wherein N is two, M is eight, Q is fifteen and P is three.

41. A method of transmitting a digital signal comprising:

generating a group of repetitive data segments comprising N and M level symbols, where M is greater than N;

generating a special data segment including a field timing signal comprising a plurality of said N level symbols; and transmitting said group of repetitive data segments and said field timing signal.

42. The method of claim 41 including precoding said group of repetitive data segments except for said special data segment.

43. The method of claim 42 wherein said precoding is accomplished by modulo 4 precoding of said group of repetitive data segments.

44. The method of claim 41 wherein N is equal to 2 and M is equal to 4 and wherein the levels of said 2 level symbols comprise the levels intermediate the upper and lower pairs of levels of said 4 level symbols.

45. A digital signal receiver comprising:

means for receiving a digital video signal comprising repetitive data segments of 8 level symbols, with one of said data segments including a field timing signal of 2 level symbols;

means for developing a reference field timing signal at the repetition rate of said repetitive data segments; and means for comparing at least a portion of each received data segment with said reference field timing signal to identify said one data segment.

46. The receiver of claim 45 wherein the 2 levels of said field timing signal symbols coincide with the second and seventh levels of said 8 level symbols.

47. The receiver of claim 45 wherein each of said data segments is preceded by a 2 level data segments synchronizing character, said 2 levels of said data segment synchronizing character being the same as the 2 levels of said field timing signal.

48. A digital signal receiver comprising:

means for receiving a digital signal comprising repetitive data segments of 16 level symbols, with one of said data segments including a field timing signal of 2 level symbols;

means for developing a reference field timing signal at the repetition rate of said repetitive data segments; and means for comparing at least a portion of each received data segment with said reference field timing signal to identify said one data segment.

49. The receiver of claim 48 wherein the 2 levels of said field timing signal symbols coincide with the fourth and thirteenth levels of said 16 level symbols.

50. The receiver of claim 48 wherein each of said data segments is preceded by a 2 level data segment synchronizing character, said 2 levels of said data segment synchronizing character being the same as the 2 levels of said field timing signal.

51. A method of operating a digital transmission system comprising:

transmitting data as 8 level symbols with a given amplitude range; and transmitting sync information as 2 level symbols having amplitudes that correspond to levels 2 and 7 of said 8 level symbols.

52. A method of operating a digital transmission system comprising:

transmitting data as 16 level symbols with a given amplitude range; and transmitting sync information as 2 level symbols having amplitudes that correspond to levels 4 and 13 of the 16 level symbols.

53. A method of operating a digital transmission system comprising:

transmitting data as multilevel symbols with a given amplitude range; and transmitting sync information as 2 level symbols having amplitudes that occur at respective levels nested within the outermost levels of said multi level symbols.

54. A digital signal receiver comprising:

means for receiving a digital signal comprising repetitive data segments of N level symbols, with one of said data segments including a field timing signal of 2 level symbols;

means for developing a reference field timing signal at the repetition rate of said repetitive data segments; and means for comparing at least a portion of each received data segment with said reference field timing signal to identify said one data segment.

55. The receiver of claim 54 wherein said N level symbols comprise 8 level symbols and wherein the 2 levels of said field timing signal symbols coincide with levels 2 and 7 of said 8 level symbols.

56. The receiver of claim 54 wherein said N level symbols comprise 16 level symbols and wherein the two levels of said field timing signal coincide with levels 4 and 13 of said 16 level symbols.

57. The receiver of claim 54 where N is at least equal to 4 and wherein the two levels of said field timing signal occur at respective levels intermediate selected pairs of adjacent levels of said N level symbols.

58. The receiver of claim 6 wherein said video information comprises 8 level data symbols and wherein said field timing signal comprises 2 level symbols that correspond to levels 2 and 7 of said 8 level data symbols.

59. The receiver of claim 6 wherein said video information comprises R level data symbols and said field timing signal comprises S level symbols, where R is greater than S, the levels of said field timing signal occurring at respective levels intermediate selected levels of said R level data symbols.

60. The receiver of claim 18 wherein said video information comprises 8 level data symbols and wherein said field timing signal comprises 2 level symbols that correspond to levels 2 and 7 of said 8 level data symbols.

61. The receiver of claim 18 wherein said video information comprises R level data symbols and said field timing signal comprises S level symbols, where R is greater than S, the levels of said field timing signal occurring at respective levels intermediate selected levels of said R level data symbols.

62. The receiver of claim 30 wherein N is equal to 8 and wherein said two predetermined levels correspond to levels 2 and 7 of said 8 levels.

63. The method of claim 41 wherein N is equal to 2 and M is equal to 8 and wherein the levels of said 2 level symbols comprise levels 2 and 7 of said 8 level symbols.

64. The digital receiver of claim 48 wherein the two levels of said field timing signal symbols occur at respective levels nested within the outermost levels of said 16 level symbols.

65. A digital signal receiver comprising:

means for receiving a digital signal comprising 8 level data symbols and 2 level sync symbols;

means for generating a timing signal in response to said received 2 level sync signal; and means responsive to said timing signal for processing said 8 level data symbols.

66. The receiver of claim 65 wherein the levels of said 2 level signals coincide with levels 2 and 7 of said 8 level data symbols.

67. A digital signal receiver comprising:

means for receiving a digital signal comprising 16 level data symbols and 2 level sync symbols;

means for generating a timing signal in response to said received 2 level sync signal; and means responsive to said timing signal for processing said 16 level data symbols.

68. The receiver of claim 65 wherein the levels of said 2 level signals coincide with levels 4 and 13 of said 16 level data symbols.

69. The method of claim 36 further comprising receiving the transmitted data and sync information.

70. The method of claim 37 further comprising receiving the transmitted data and sync information.

71. The method of claim 41 further comprising receiving the transmitted data segments.

72. The method of claim 51 further comprising receiving the transmitted data and sync information.

73. The method of claim 52 further comprising receiving the transmitted data and sync information.

74. The method of claim 53 further comprising receiving the transmitted data and sync information.

* * * * *

UNITED STATES PATENT AND TRADEMARK OFFICE
CERTIFICATE OF CORRECTION

PATENT NO. : 5,598,220
DATED : January 28, 1997
INVENTOR(S) : Richard W. Citta et al.

It is certified that error appears in the above-indentified patent and that said Letters Patent is hereby corrected as shown below:

Column 9:

In claim 1, line 10, cancel "time" and substitute therefor -- timing --
In claim 9, line 55, cancel "E" and substitute therefore -- P --.

Signed and Sealed this

Eighth Day of April, 1997

Attest:

BRUCE LEHMAN

*Attesting Officer*     *Commissioner of Patents and Trademarks*